United States Patent
Nichols et al.

(10) Patent No.: US 7,461,104 B2
(45) Date of Patent: Dec. 2, 2008

(54) METHOD AND SYSTEM FOR RAPID DATA-FRAGMENTATION ANALYSIS OF A NEW TECHNOLOGY FILE SYSTEM

(75) Inventors: Tony Nichols, Erie, CO (US); Paul Para, Boulder, CO (US)

(73) Assignee: Webroot Software, Inc., Boulder, CO (US)

( * ) Notice: Subject to any disclaimer, the term of this patent is extended or adjusted under 35 U.S.C. 154(b) by 267 days.

(21) Appl. No.: 11/386,594

(22) Filed: Mar. 22, 2006

(65) Prior Publication Data
US 2007/0226265 A1  Sep. 27, 2007

(51) Int. Cl.
G06F 7/26 (2006.01)
(52) U.S. Cl. .......................... 707/206; 707/200
(58) Field of Classification Search .................. None
See application file for complete search history.

(56) References Cited

U.S. PATENT DOCUMENTS

| | | | |
|---|---|---|---|
| 5,715,455 A | 2/1998 | Macon | |
| 5,930,467 A | 7/1999 | Morita | |
| 5,930,828 A * | 7/1999 | Jensen et al. | 711/170 |
| 6,173,291 B1 | 1/2001 | Jenevein | |
| 6,397,311 B1 | 5/2002 | Capps | |
| 6,496,913 B1 | 12/2002 | Taugher | |
| 2001/0029511 A1 | 10/2001 | Burda | |
| 2001/0047451 A1 | 11/2001 | Noble | |
| 2006/0236069 A1 | 10/2006 | Kalach | |

FOREIGN PATENT DOCUMENTS

WO PCT/US2007/064487  11/2007

OTHER PUBLICATIONS

U.S. Appl. No. 11/145,593,Tony Nichols et al., filed Jun. 6, 2005.
U.S. Appl. No. 11/386,375,Tony Nichols et al., filed Mar. 22, 2006.
U.S. Appl. No. 11/363,819,Tony Nichols et al., filed Feb. 28, 2006.
NTFSPROGS—TODO [On line]; Aug. 2004, pp. 1-15; XP002448002; linus.file-systems.ntfs.file-systems.ntfs.devel/2004-08/msg00023.html [retrieved on Aug. 23, 2007].
Fellows, G.H.: "The Joys of Complexity and the Deleted File"; Digital Investigation, Elsevier; vol. 2, No. 2, Jun. 2005, pp. 89-93; XP004926346; ISSN: 1742-2876.
Fellows G.H.; "The joys of complexity and the deleted file"; Digital Investigation, Elsevier, vol. 2, No. 2, Jun. 2005, pp. 89-93; XP004926346; ISSN: 1742-2876.
Mikhailov D; "NTFS File System" Internet Article; [online]; Aug. 4, 2005; XP002438114; Retrieved from the Internet: URL:http//coteia.icmc.usp.br/coteia/upload/160/NTFS.pdf; retrieved on Jun. 18, 2007.

(Continued)

Primary Examiner—B. James Peikari
(74) Attorney, Agent, or Firm—Cooley Godward Kronish LLP

(57) ABSTRACT

A method and system for rapid data-fragmentation analysis of a New Technology File System (NTFS) is described. In one embodiment, the Master File Table (MFT) associated with a NTFS volume is analyzed to estimate the extent of data fragmentation on the NTFS volume, the analysis being performed substantially without using directory index information associated with the NTFS volume.

17 Claims, 4 Drawing Sheets

OTHER PUBLICATIONS

Database EPODOC European Patent Office, The Hague, NL; Jun. 11, 2003; Lin Guangxin [CN]; Liu Yabin [CN]; "Method and System for Computing Fragment Rate of Magnetic Disc"—XP002451265 Abstract.

Database EPODOC European Patent Office, The Hague, NL; Jan. 11, 2003; Lin Kuang-Shin [TW]; Liu Ya-bin [CN]; "Method and System for Calculating Fragment Rate of Disk"—XP002451266 Abstract.

* cited by examiner

METHOD AND SYSTEM FOR RAPID DATA-FRAGMENTATION ANALYSIS OF A NEW TECHNOLOGY FILE SYSTEM

RELATED APPLICATIONS

The present application is related to the following commonly owned and assigned applications: U.S. application Ser. No. 11/386,375, "Method and System for Rapid Data-Fragmentation Analysis of a File-Allocation-Table (FAT) File System," filed herewith; and U.S. application Ser. No. 11/145,593, "System and Method for Neutralizing Locked Pestware Files," which is incorporated herein by reference in its entirety.

FIELD OF THE INVENTION

The present invention relates to computer storage technology. In particular, but without limitation, the present invention relates to methods and systems for performing a data-fragmentation analysis of a New Technology File System (NTFS).

BACKGROUND OF THE INVENTION

A number of variables influence computer performance. Factors such as processor speed, the size and speed of random-access memory (RAM), the speed of the system's internal bus, and the speed of disk access all play a role. The speed of disk access is particularly important since disk drives are slower than RAM, and many computer applications involve extensive disk access.

A formatted computer storage medium (e.g., a hard disk) typically contains data storage units called "clusters," each of which is usually a power-of-two multiple of a smaller 512-byte-long unit called a "sector"; directory or index information about the files and folders stored on the storage medium; and a system for keeping track of which clusters are in use and to which file or folder each cluster belongs. Two well-known file-system architectures are the file-allocation-table (FAT) file system and the New Technology File System (NTFS). These two architectures take very different approaches to organizing and keeping track of data on a storage medium.

The longer a storage medium is used, the more fragmented the data on the storage medium become. That is, the clusters associated with an increasing number of files on the storage medium are scattered rather than contiguous. On a disk drive, reading a fragmented file requires more time than reading a non-fragmented file because the drive head has to jump around on the storage medium to access the scattered clusters making up the file. This extra "seek time" degrades system performance. Since flash-memory-based storage media such as secure digital (SD) cards and multi-media cards (MMCs) are typically formatted like disk volumes, fragmentation can also slow down the reading of data from those storage media, although the problem of seek time that occurs with disk drives is absent.

Utilities for defragmenting a storage medium have become commonplace. Such utilities rewrite the data on the storage medium, rendering contiguous the clusters making up each file. Before a computer user incurs the time and possible risk to data involved in using a defragmentation utility, however, the user may wish to test the storage medium first to measure the extent of data fragmentation. Conventional methods for evaluating the extent of fragmentation on a storage medium employing a NTFS file system involve traversing the file system's directory structure to identify files one at a time, locating the Master-File-Table (MFT) record for each file, and evaluating the fragmentation state of that file. These conventional methods can require a significant amount of time to execute (e.g., several minutes), especially for large storage volumes.

It is thus apparent that there is a need in the art for an improved method and system for rapid data-fragmentation analysis of a NTFS file system.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a method and system for rapid data-fragmentation analysis of a New Technology File System (NTFS). One illustrative embodiment of the invention is a method comprising analyzing a Master File Table (MFT) associated with a NTFS volume to estimate the extent of data fragmentation on the NTFS volume, the analysis being performed substantially without using directory index information associated with the NTFS volume.

Another illustrative embodiment is a system comprising an analysis module configured to analyze a MFT associated with a NTFS volume to estimate the extent of data fragmentation on the NTFS volume, the analysis module being configured to analyze the MFT substantially without using directory index information associated with the NTFS volume.

Another illustrative embodiment is a computer-readable storage medium containing program instructions comprising an analysis instruction segment configured to analyze a MFT associated with a NTFS volume to estimate the extent of data fragmentation on the NTFS volume, the analysis instruction segment being configured to analyze the MFT substantially without using directory index information associated with the NTFS volume. These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Evaluating the extent of data fragmentation ("fragmentation analysis") on a New Technology File System (NTFS) volume can be sped up significantly by analyzing the Master File Table (MFT) substantially without using directory index information associated with the NTFS volume. In one illustrative embodiment, MFT records are read sequentially from the first MFT record associated with data to the last MFT record, and no use is made at all of directory index information in performing the fragmentation analysis. In other illustrative embodiments, limited use is made of directory index information. A variety of statistics may be gathered to evaluate the extent of data fragmentation on the NTFS volume. The results may be reported to a user, and a recommendation may be made that the storage medium be defragmented, if the extent of data fragmentation exceeds a predetermined threshold.

Data fragmentation on the NTFS volume can detected by counting the number of data runs referenced in the data attributes of MFT records associated with files having non-resident data or "extents" (data external to the MFT itself). Herein, a "fragmentation" is an interruption in the contiguity on the NTFS volume of the clusters making up a file. If the data attribute of a MFT record references exactly one data run, the associated file is not fragmented (herein a "non-fragmented file"). A file whose data is small enough to fit entirely within its MFT record (resident data) is also, by definition, non-fragmented. If the data attribute of a MFT record references more than one data run, the associated file is fragmented (herein a "fragmented file"). A tally may be kept of fragmented and/or non-fragmented files.

Since the data attribute of the MFT record associated with a given file contains the number of clusters in each data run, the number of clusters in each data run may, in the case of a non-fragmented file, be included in a count of "non-fragmented clusters" (clusters associated with non-fragmented files). In the case of a fragmented file, the number of clusters in each data run may be included in a count of "fragmented clusters" (clusters associated with fragmented files).

Counting MFT records reveals the number of files and folders on the NTFS volume. Used clusters on the NTFS volume may also be counted as the MFT records are examined. The various statistics gathered can be used to compute and report an estimate of the extent of data fragmentation on the NTFS volume. In one illustrative embodiment, the ratio of fragmented clusters to total used clusters on the NTFS volume is computed and used to determine whether defragmentation of the NTFS volume is advisable.

Figure 1:
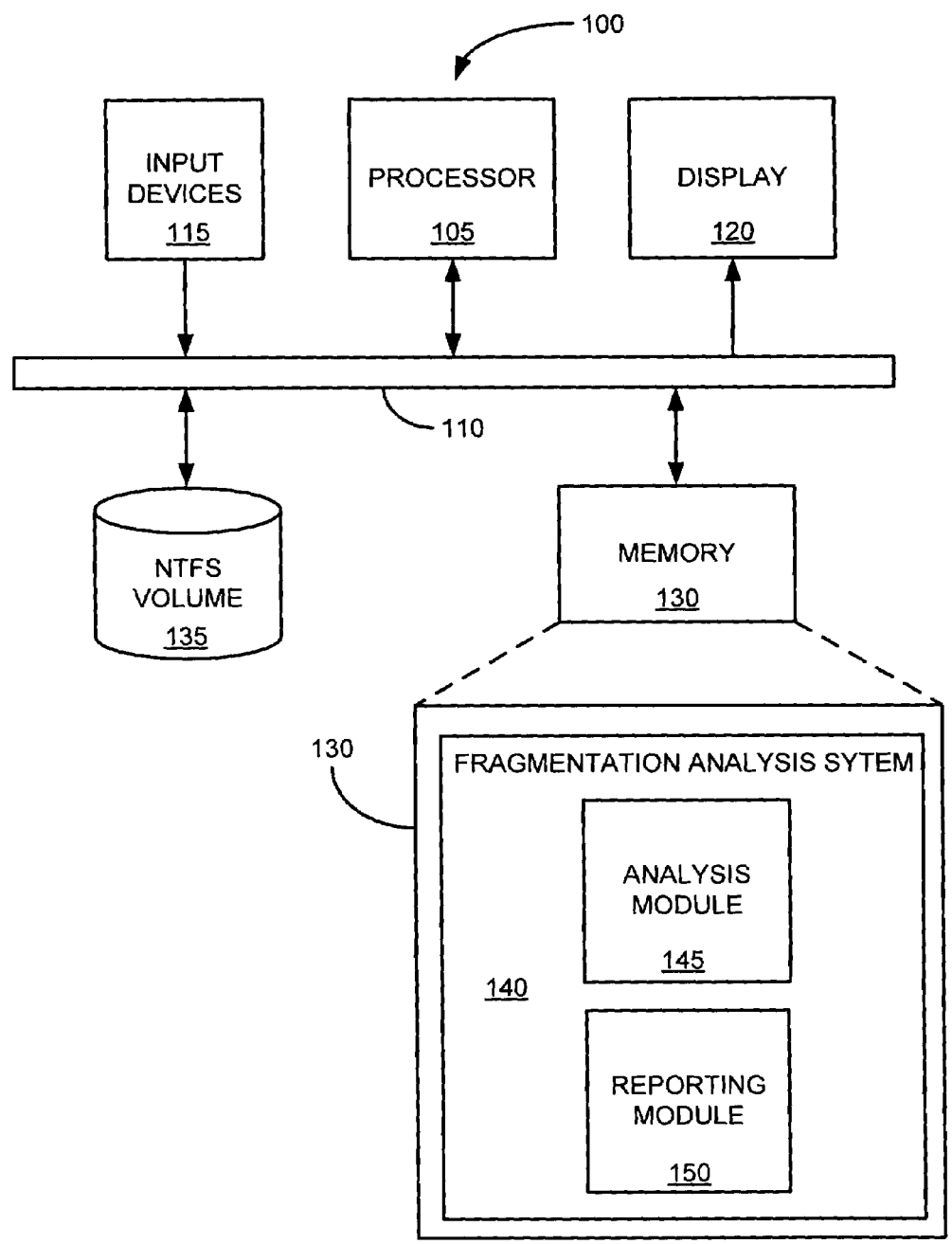
FIG. 1 is a high-level functional block diagram of a computer equipped with a fragmentation analysis system, in accordance with an illustrative embodiment of the invention.

Referring now to the drawings, where like or similar elements are designated with identical reference numerals throughout the several views, FIG. 1 is a high-level functional block diagram of a computer 100 equipped with a fragmentation analysis system, in accordance with an illustrative embodiment of the invention. Computer 100 may be a desktop computer, workstation, laptop computer, notebook computer, handheld computer, or any other device that includes computing functionality. In FIG. 1, processor 105 communicates over data bus 110 with input devices 115, display 120, memory 130, and NTFS volume 135.

Input devices 115 may be, for example, a keyboard and a mouse or other pointing device. In an illustrative embodiment, NTFS volume 135 is a disk volume such as a hard disk drive (HDD). In other embodiments, however, NTFS volume 135 can be any type of rewritable NTFS volume, including, without limitation, magnetic disks, rewritable optical discs, and flash-memory-based storage media such as secure digital (SD) cards and multi-media cards (MMCs). Memory 130 may include random-access memory (RAM), read-only memory (ROM), or a combination thereof.

Fragmentation analysis system 140 estimates the extent of data fragmentation on storage medium 135. In the illustrative embodiment of FIG. 1, fragmentation analysis system 140 is an application program stored on a computer-readable storage medium of computer 100 (e.g., NTFS volume 135) that can be loaded into memory 130 and executed by processor 105. In other embodiments, the functionality of fragmentation analysis system 140 can be implemented in software, firmware, hardware, or any combination thereof.

For convenience in this Detailed Description, the functionality of fragmentation analysis system 140 has been divided into two modules, analysis module 145 and reporting module 150. In various embodiments of the invention, the functionality of these two modules may be combined or subdivided in a variety of ways different from that shown in FIG. 1. Analysis module 145 is configured to fetch and analyze MFT records to estimate the extent of data fragmentation on NTFS volume 135. Optional reporting module 150 is configured to report the results of the fragmentation analysis to a user and, where applicable, to recommend defragmentation.

As explained above, fragmentation analysis system 140 performs its functions substantially without using directory index information associated with NTFS volume 135. In one illustrative embodiment, fragmentation analysis system 140 does not use directory index information at any time prior to or during the fragmentation analysis.

To facilitate the description of illustrative embodiments of the invention, a brief overview of some aspects of the NTFS architecture will next be provided. A NTFS volume, like a file-allocation-table (FAT) volume, is divided into units of storage called clusters. Typically, the first 12 percent of a NTFS volume is reserved for the MFT to reduce the probability of the MFT becoming fragmented, and a copy of the first 16 MFT records resides at the center of the volume to facilitate data recovery, if the original MFT records become corrupted. The remaining portions of the NTFS volume are available for data external to the MFT. NTFS treats all system components as files, and the MFT is a special file that is much like a relational database table. The MFT contains a record (typically 1 KB long) for each file on the NTFS volume (folders are also treated as "files"). The MFT itself may be located by reading the first sector of the NTFS volume. This first sector of the volume specifies where the NTFS begins, the number of MFT records, and the size of each MFT record.

Each file or folder on the NTFS volume consists of a set of attributes in its corresponding MFT record. Attributes include information such as name, creation date, last-modified date, file type, security information, even file data itself. For example, the MFT record of a folder (also commonly called a directory) includes index attributes (e.g., the "Index Root Attribute" and the "Index Allocation Attribute") that contain or point to an index of the files and subfolders within that folder. This kind of index information regarding the location of files and folders on the NTFS volume and their hierarchical relationships to one another is herein called "directory index information." It is the kind of information that one could acquire from directory tables in a FAT file system. As already mentioned, fragmentation analysis system 140 performs its functions substantially without the use of such directory index information and, in some illustrative embodiments, does so entirely without the use of such information. In general, the directory structure of a NTFS volume is organized using B-trees to facilitate searching for specific files or folders.

The MFT record of a data file includes one or more data attributes. One such attribute is called "0x80 $Data" (herein called "the data attribute"), which may be of two types for resident and non-resident data. If the file's data are small enough to fit within the data attribute of its MFT record, the actual file data reside there. Such a file is said to have "resident" data and is, by definition, non-fragmented, as explained above. If, however, the file is too large to fit within the data attribute of its MFT record, the data attribute instead contains a reference to "non-resident" data or "extents" outside the MFT. Each block of contiguous clusters referenced is called a "data run." A file having non-resident data may have only a single data run, in which case it is a non-fragmented file. If the file has more than one data run, it is fragmented file. Each reference to a data run in the data attribute includes the beginning cluster of that data run and the number of contiguous clusters in that data run.

Figure 2:
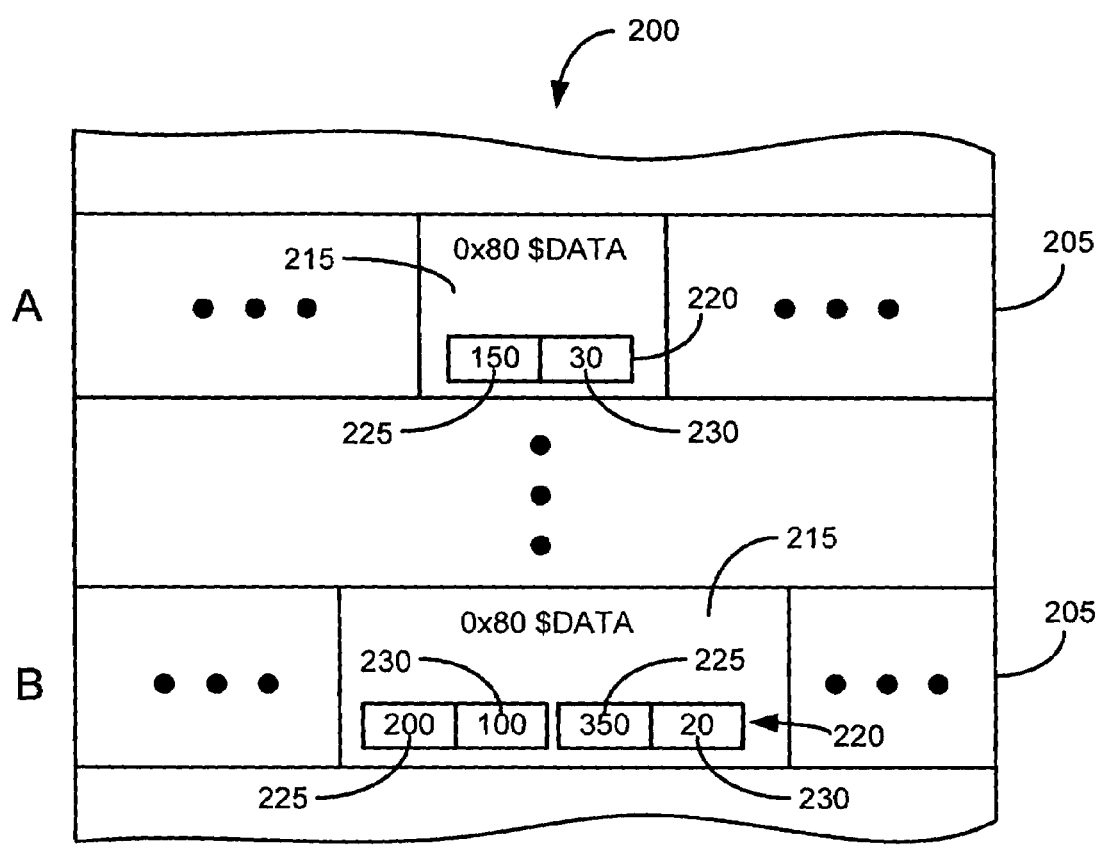
FIG. 2 is a diagram of a Master File Table (MFT) associated with a New Technology File System (NTFS) volume, in accordance with an illustrative embodiment of the invention.

FIG. 2 is a diagram of a MFT 200 associated with NTFS volume 135, in accordance with an illustrative embodiment of the invention. MFT 200 contains a record 205 for each file on NTFS volume 135. Two illustrative records 205, marked "A" and "B" to distinguish them, are shown in FIG. 2. MFT record 205 "A" includes data attribute (0x80 $Data) 215, which contains a reference 220 to a single data run (an "extent") that lies elsewhere on NTFS volume 135 (i.e., outside MFT 200). Reference 220 contains the starting cluster 225 (cluster 150 in this example) of the single data run and the number of clusters 230 in the single data run (30 in this example). The file defined by MFT record 205 "A" is a non-fragmented file because its data attribute 215 references only one data run. Analysis module 145 may count such a file as "non-fragmented." Also, analysis module 145 may add the number of clusters 230 in the single data run (30 clusters in this example) to a count of non-fragmented clusters.

Data attribute 215 of MFT record 205 "B," unlike that of MFT record 205 "A," references more than one data run. It contains two separate references 220 pointing to two separate data runs that lie outside MFT 200. The file defined by MFT record 205 "B" is, therefore, fragmented because its data is not stored in a single contiguous data run. Analysis module 145 may count such a file as "fragmented." Also, analysis module 145 may add the number of clusters 230 in each data run (120 total clusters in this example) to a count of fragmented clusters.

In general, analysis module 145 can determine whether a given file on NTFS volume 135 is non-fragmented or fragmented by counting the number of data runs referenced in data attribute 215 of its MFT record 205. One such reference (or resident data) indicates a non-fragmented file. More than one such reference indicates a fragmented file.

Figure 3:
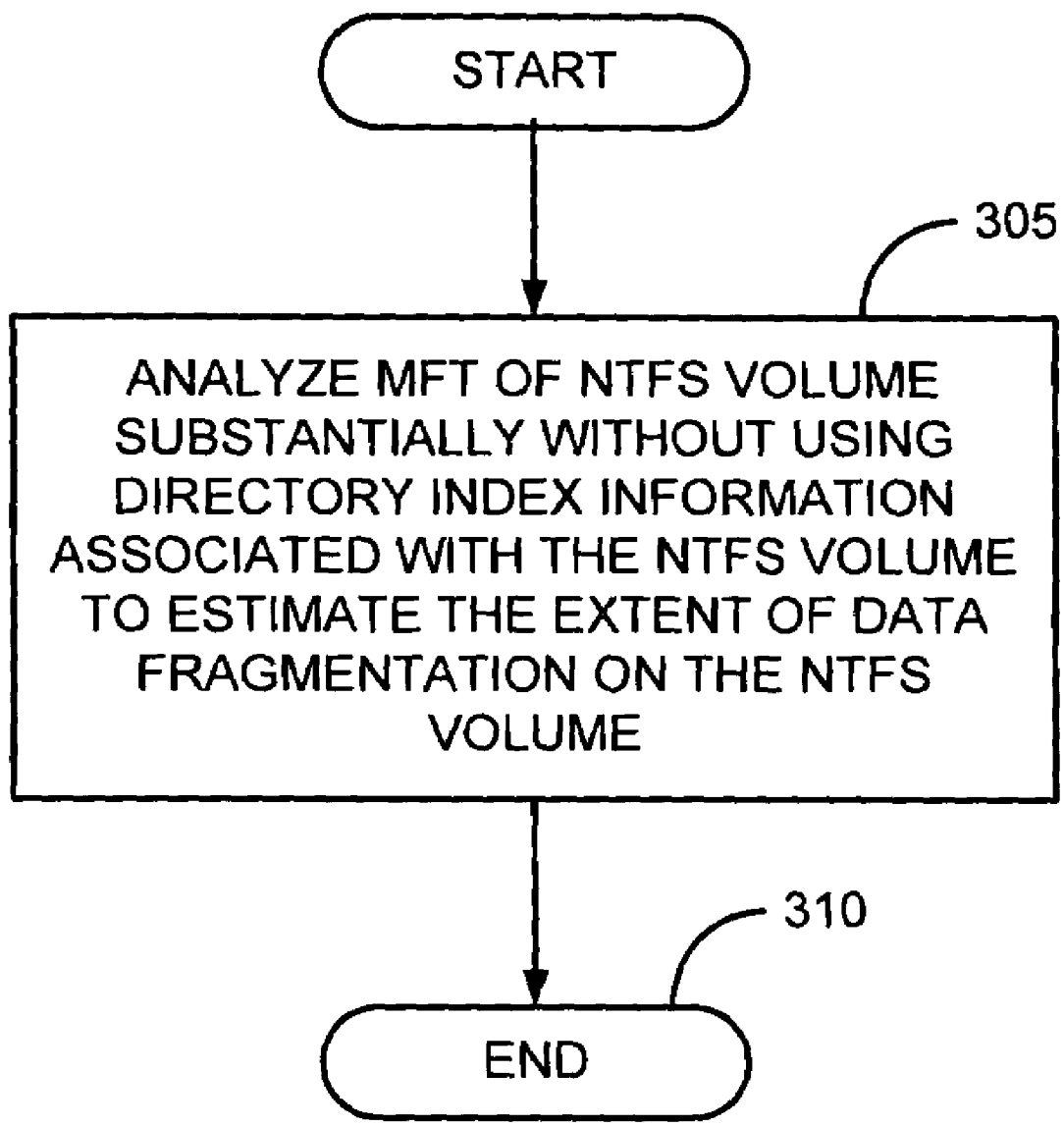
FIG. 3 is a flowchart of a method for rapid data-fragmentation analysis of a NTFS volume, in accordance with an illustrative embodiment of the invention.

FIG. 3 is a flowchart of a method for rapid data-fragmentation analysis of a NTFS volume 135, in accordance with an illustrative embodiment of the invention. At 305, analysis module 145 analyzes MFT 200 of NTFS volume 135 substantially without using directory index information associated with NTFS volume 135 to estimate the extent of data fragmentation on NTFS volume 135, as explained above. At 310, the process terminates.

Figure 4:
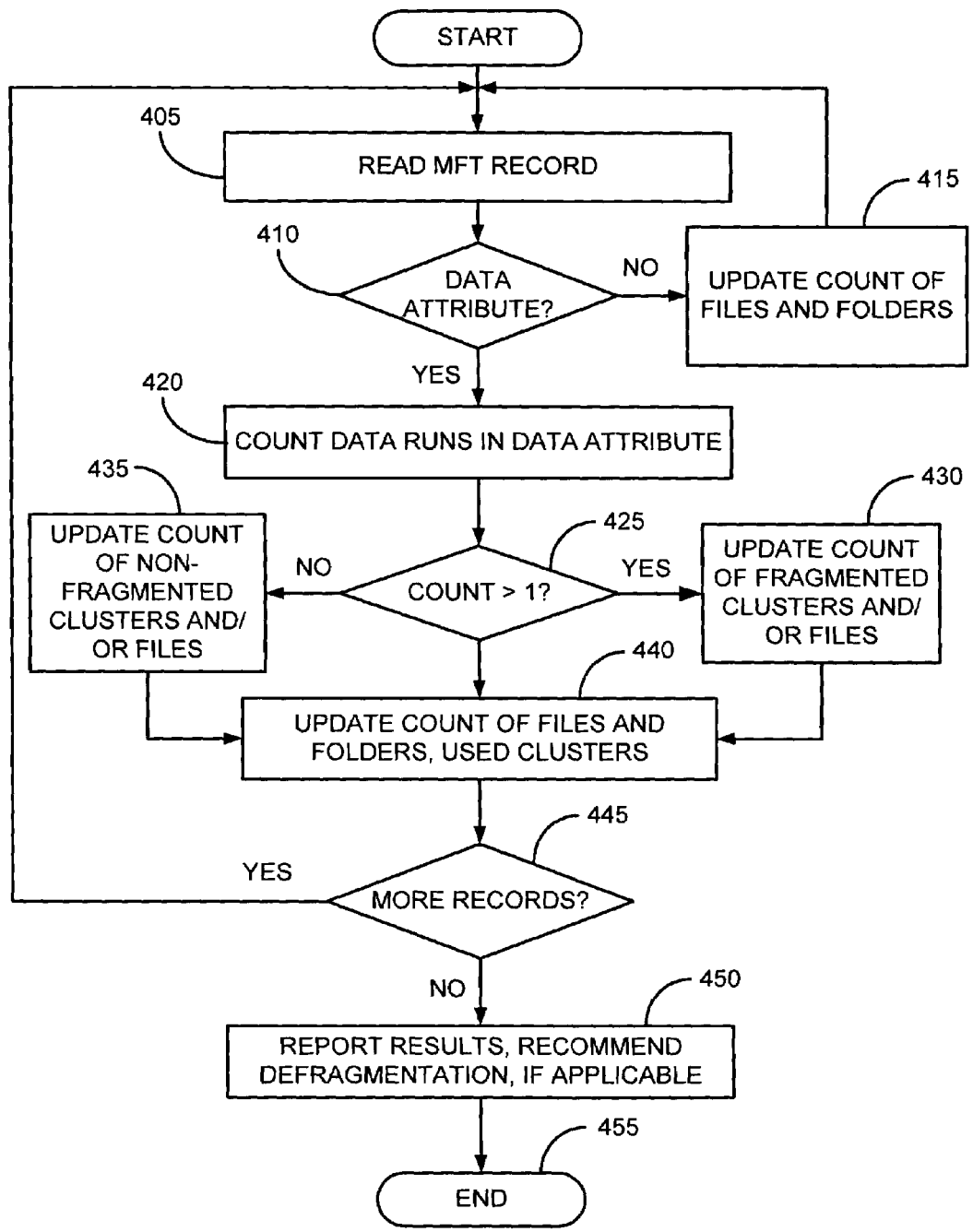
FIG. 4 is a flowchart of a method for rapid data-fragmentation analysis of a NTFS volume, in accordance with another illustrative embodiment of the invention.

FIG. 4 is a flowchart of a method for rapid data-fragmentation analysis of a NTFS volume 135, in accordance with another illustrative embodiment of the invention. At 405, analysis module 145 reads (fetches from NTFS volume 135) a MFT record 205. In an illustrative embodiment, analysis module 145 begins with the first MFT record 205 associated with data (e.g., the seventeenth MFT record 205) and proceeds, in each pass of the loop shown in FIG. 4, to the next consecutive MFT record 205 until the last MFT record has been read. At 410, analysis module 145 determines whether the MFT record 205 read at 405 includes a data attribute 215. If not (e.g., the MFT record 205 is associated with a folder), analysis module 145 may, at 415, update a count of files and folders on NTFS volume 135 (since each file or folder on NTFS volume 135 has an associated MFT record 205, counting MFT records 205 is equivalent to counting the files and folders on the volume), and the process returns to 405.

If the MFT record 205 read at 405 has a data attribute 215 at 410, analysis module 145 counts the number of data runs referenced in data attribute 215 at 420. If the count exceeds one at 425, analysis module 145 updates a count of fragmented files and/or clusters at 430. If the count at 425 is one, analysis module 145 updates a count of non-fragmented files and/or clusters at 435. At 440, analysis module updates other statistics such as a count of files and folders on NTFS volume 135 and a count of used clusters on NTFS volume 135. If there are more MFT records 205 to examine at 445, the process returns to 405. Otherwise, optional reporting module 150 reports the results of the fragmentation analysis to a user at 450. If the estimated extent of data fragmentation on NTFS volume 135 exceeds a predetermined threshold (e.g., 20 percent), reporting module 150 may also recommend that NTFS volume 135 be defragmented to improve the performance of computer 100. At 455, the process terminates.

In conclusion, the present invention provides, among other things, a method and system for rapid data-fragmentation analysis of a NTFS file system. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims. For example, it is not required that all of the various statistics mentioned above be collected in every embodiment of the invention. In some embodiments, some subset of those statistics or even other statistics not mentioned herein that, nevertheless, can be derived from examining a MFT 200 may be collected in analyzing a NTFS volume 135 for fragmentation.

What is claimed is:

1. A method, comprising:
analyzing a Master File Table (MFT) associated with a New Technology File System (NTFS) volume to estimate the extent of data fragmentation on the NTFS volume as a whole, the analyzing being performed without using directory index information associated with the NTFS volume;
wherein analyzing the MFT includes counting the number of data runs referenced in a data attribute of a record of the MFT, the data attribute including the number of clusters in each data run.

2. The method of claim 1, further comprising:
reporting to a user the estimated extent of data fragmentation on the NTFS volume; and
recommending to the user that the NTFS volume be defragmented, when the estimated extent of data fragmentation exceeds a predetermined threshold.

3. The method of claim 1, wherein the counting is performed for each record of the MFT in sequential order.

4. The method of claim 1, further comprising:
updating a count of fragmented files, when the data attribute references more than one data run.

5. The method of claim 1, further comprising:
adding the number of clusters in each data run to a count of clusters associated with fragmented files on the NTFS volume, when the data attribute references more than one data run.

6. The method of claim 1, further comprising:
updating a count of non-fragmented files, when the data attribute references only one data run.

7. The method of claim 1, further comprising:
adding, when the data attribute references only one data run, the number of clusters in the one data run to a count of clusters associated with non-fragmented files on the NTFS volume.

8. The method of claim 1, wherein analyzing includes counting used clusters on the NTFS volume.

9. The method of claim 1, wherein analyzing includes counting MFT records to count files and directories on the NTFS volume.

10. A system, comprising:
an analysis module configured to analyze a Master File Table (MFT) associated with a New Technology File System (NTFS) volume to estimate the extent of data fragmentation on the NTFS volume as a whole, the analysis module being configured to analyze the MFT without using directory index information associated with the NTFS volume;
wherein the analysis module, in analyzing the MFT, is configured to count the number of data runs referenced in a data attribute of a record of the MFT, the data attribute including the number of clusters in each data run.

11. The system of claim 10, further comprising:
a reporting module configured to:
report to a user the estimated extent of data fragmentation on the NTFS volume; and
recommend to the user that the NTFS volume be defragmented, when the estimated extent of data fragmentation exceeds a predetermined threshold.

12. The system of claim 10, wherein the analysis module is configured to update a count of fragmented files, when the data attribute references more than one data run.

13. The system of claim 10, wherein the analysis module is configured to add the number of clusters in each data run to a count of clusters associated with fragmented files on the NTFS volume, when the data attribute references more than one data run.

14. The system of claim 10, wherein the analysis module is configured to update a count of non-fragmented files, when the data attribute references only one data run.

15. The system of claim 10, wherein the analysis module is configured, when the data attribute references only one data run, to add the number of clusters in the one data run to a count of clusters associated with non-fragmented files on the NTFS volume.

16. A system, comprising:
means for accessing a Master File Table (MFT) associated with a New Technology File System (NTFS) volume; and
means for analyzing the MFT to estimate the extent of data fragmentation on the NTFS volume as a whole, the means for analyzing the MFT being configured to analyze the MFT without using directory index information associated with the NTFS volume;
wherein the means for analyzing the MFT is configured to count the number of data runs referenced in a data attribute of a record of the MFT.

17. A computer-readable storage medium containing program instructions, comprising:
an analysis instruction segment configured to analyze a Master File Table (MFT) associated with a New Technology File System (NTFS) volume to estimate the extent of data fragmentation on the NTFS volume as a whole, the analysis instruction segment being configured to analyze the MFT without using directory index information associated with the NTFS volume;
wherein the analysis instruction segment is configured to count the number of data runs referenced in a data attribute of a record of the MFT.

* * * * *